May 15, 1956 F. P. PRICE 2,745,944
COMBINED HEATING AND THERMOSENSITIVE HEATING CONTROL UNITS
Filed Dec. 16, 1954
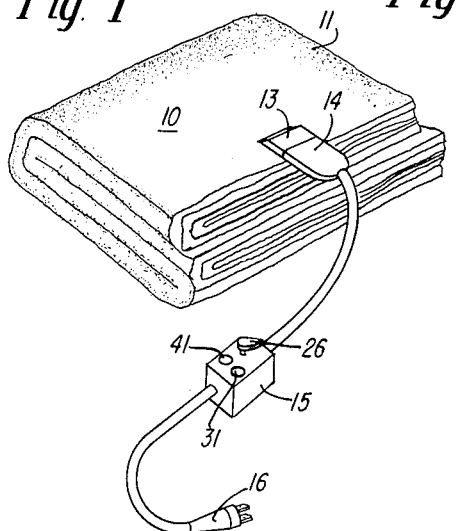
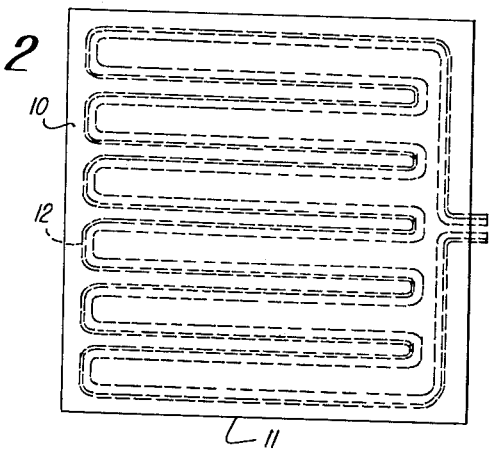
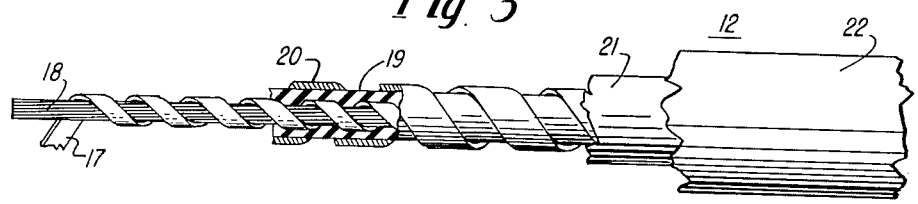
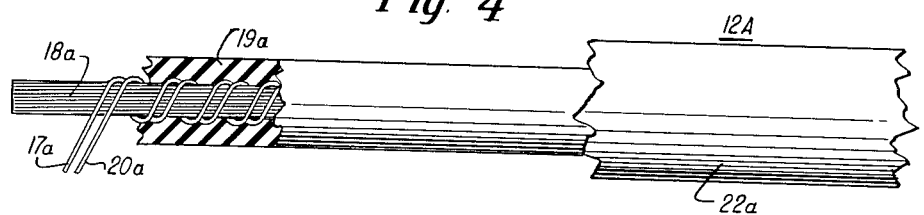
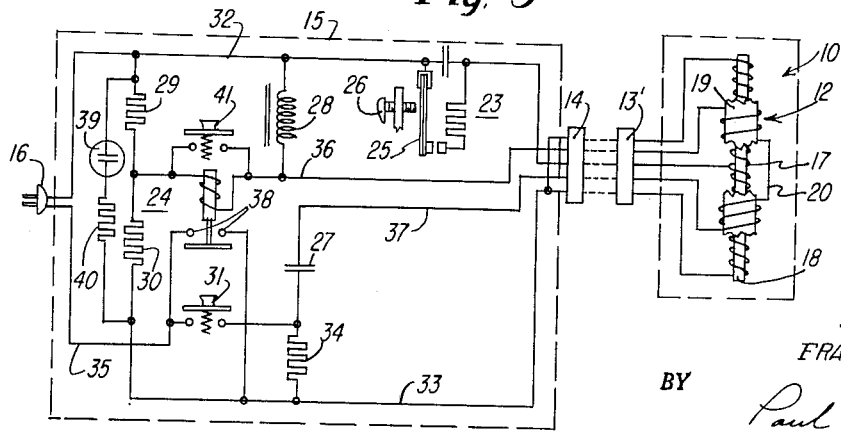
INVENTOR.
FRASER P. PRICE
BY
Paul A. Frank
ATTY

United States Patent Office 2,745,944
Patented May 15, 1956

2,745,944
COMBINED HEATING AND THERMOSENSITIVE HEATING CONTROL UNITS

Fraser P. Price, Schenectady, N. Y., assignor to General Electric Company, a corporation of New York Application December 16, 1954, Serial No. 475,758

6 Claims. (Cl. 219—46)

The present invention relates to combined heating and thermosensitive heating control units; and it is the general object of the invention to provide an improved unit of the character of that disclosed in U. S. Patent No. 2,581,212, granted on January 1, 1952, to David C. Spooner, Jr. and Milton S. Greenhalgh, that is especially designed for use in an electrically heated fabric, such, for example, as a bed cover, blanket, or the like.

The electrically heated bed cover or blanket disclosed in the Spooner et al. patent incorporates a combined heating and thermosensitive heating control unit that is of elongated cable-like structure and comprising a flexible heating conductor, a flexible signal conductor and a flexible layer of synthetic organic resin in intimate surface contact with the conductors and retaining the same in closely spaced-apart relation, the synthetic resin consisting essentially of a polyamide of the character of that sold under the generic name "nylon." This synthetic resin has a temperature-impedance coefficient, whereby the electrical insulating characteristic thereof is dependent upon the temperature thereof, the resin having a good electrical insulating characteristic only when it is at a relatively low temperature within the normal operating range of the blanket.

In the operation of this blanket, an electric heating current is conducted by the heating conductor, effecting heating thereof, and the consequent heating or warming of the fabric of the blanket. Also, a signal potential is impressed between the signal conductor and the heating conductor, whereby a signal current of controlling magnitude is conducted between these two conductors through the synthetic resin only in the event the temperature of the resin is above the normal operating range of the blanket; which signal current is employed to effect a control bringing about the interruption of the heating current so as to protect the blanket against substantial overheating and the consequent damage to the fabric thereof. The arrangement is very advantageous since the magnitude of the signal current is increased both with an increase in the relatively high temperature of a given section of the resin and with an increase in the length of the resin that is subjected to a given relatively high temperature.

An object of the present invention is to provide a combined heating and thermosensitive heating control unit for an electrically heated blanket, that incorporates a synthetic organic elastomer having even greater resistance to water absorption and being more stable within the temperature range of operation of the blanket than cellulose esters, vinyl halide resins and polyamides, including nylon.

A further object of the invention is to provide an improved unit of the character described that incorporates an elastomer for retaining the heating conductor and the signal conductor in closely spaced-apart relationship and having a predetermined temperature-impedance characteristic wherein the elastomer comprises copolymers of butadiene and acrylonitrile, is age-resistant and moisture-resistant, and is stable and of high tensile strength in the operating temperature range of a fabric in which it is incorporated, whereby the unit is of exceedingly long life in use in the fabric mentioned.

Further features of the invention pertain to the particular arrangement of the elements of the combined heating and thermosensitive heating control unit, whereby the above-outlined and additional operating features thereof are attained.

The invention, both as to its organization and method of operation, together with further objects and advantages thereof, will best be understood by reference to the following specification taken in connection with the accompanying drawing, in which:

Figure 1 is a perspective view of a folded electrically heated bed cover or blanket incorporating a combined heating and thermosensitive heating control unit embodying the present invention;

Fig. 2 is a reduced plan view of the unfolded blanket shown in Fig. 1;

Fig. 3 is a greatly enlarged fragmentary side elevational view of a portion of the cable-like unit incorporated in the blanket shown in Figs. 1 and 2;

Fig. 4 is a greatly enlarged fragmentary side elevational view of a portion of a modified form of the cable-like unit that may be incorporated in the blanket shown in Figs. 1 and 2; and Fig. 5 is a diagrammatic illustration of an electric control circuit for the blanket shown in Figs. 1 and 2.

Referring now to Figs. 1 and 2 of the drawings, there is illustrated an electrically heated bed cover or blanket 10 comprising a flexible fabric 11 formed of wool, or the like, and incorporating a combined heating and thermosensitive heating control unit embodying the features of the present invention and essentially in the form of an elongated cable 12. The cable 12 may have a length of about 200 feet and is preferably distributed in a series of convolutions over the blanket area, as indicated in Fig. 2. More particularly, the cable 12 may be arranged in sinuous passages provided in the fabric 11 in the general manner disclosed in U. S. Patent No. 2,203,918, granted on June 11, 1940, to I. O. Moberg. The cable 12 incorporated in the blanket 10 is connectible by detachable plug and socket elements 13 and 14 to an electric control system housed within a control box 15 and provided with a plug 16 that is connectible to a power source of 115 volts A. C., single-phase, 60 cycles, suitable lengths of cable being arranged between the socket 14 and the control box 15 and between the control box 15 and the plug 16.

The combined heating and thermosensitive heating control unit 12 of cable-like form is shown in Fig. 3 and comprises a flexible substantially ribbon-like bare heating conductor 17 wound tightly in helical fashion about a flexible core 18 formed of strands of fiber glass, cellulose acetate, or other suitable insulating material. Arranged over the conductor 17 in intimate surface contact therewith, there is provided, as by extrusion, a flexible layer 19 of a solid moisture-resistant butadiene-acrylonitrile elastomer composition having given physical characteristics, and also predetermined temperature-impedance characteristics so as to provide a control effect, as explained more fully hereinafter. Arranged over the layer 19 and wound tightly thereon in helical fashion in intimate surface contact therewith, is a flexible bare signal conductor 20, that is also preferably of ribbon-like form. Arranged over the signal conductor 20 and the layer 19, there is provided, as by extrusion, an inner coating or layer 21 of polyethylene, or other water-inhibiting material; and then over the layer 21, there is arranged, as by extrusion, an outer coating 22 having good electrical-insulating and abrasion-resistant qualities, and capable of withstanding laundering and dry-cleaning of the blanket 10. For example, the outer coating 22 may be formed of a suitable polyvinyl chloride composition. The layers 21 and 22 are also suitably flexible, so that the cable 12, as a whole, possesses a degree of flexibility of the order of that of the fabric 11 of the blanket 10, since the blanket 10 is normally subjected in use to frequent flexure and folding. The outside diameter of the cable 12 may be, for example, of the order of $1/40''$, so that it does not render unduly lumpy the fabric 11 of the blanket 10. In the arrangement, the layer 19 of butadiene-acrylonitrile elastomer not only retains the heating conductor 17 and the signal conductor 20 in predetermined closely spaced-apart relation, but it is also in intimate contact with the adjacent surfaces of the conductors 17 and 20 and serves variably electrically to insulate them from each other in response to temperature, when a signal potential is impressed therebetween, as explained more fully subsequently.

In Fig. 4, a modified form of the combined heating and thermosensitive heating control unit 12A is illustrated that is also of elongated cable-like structure and comprises a flexible insulating core 18a, carrying a flexible bare heating conductor 17a and a flexible bare signal conductor 20a arranged in parallel spaced-apart relation and tightly wound in helical bifilar fashion thereon. Over the core 18a and the conductors 17a and 20a there is provided, as by extrusion, a flexible layer 19a of butadiene-acrylonitrile elastomer; and over the layer 19a, there is provided, as by extrusion, a flexible coating 22a of electrical-insulating and abrasion-resistant material. In the arrangement, the layer 19a of butadiene-acrylonitrile elastomer not only retains the heating conductor 17a and the signal conductor 20a in predetermined closely spaced-apart relation, but it is also in intimate contact with the adjacent surfaces of the conductors 17a and 20a and serves variably electrically to insulate them from each other in response to temperature, when a signal potential is impressed therebetween, as explained more fully subsequently.

Referring now to Fig. 5, the circuit control arrangement that is governed by the unit 12 (or the unit 12A) may be of the character of that disclosed in U. S. Patent No. 2,565,478, granted on August 28, 1951, to George C. Crowley; and this arrangement comprises a safety or overheating cutout circuit for the protection of the blanket 10. In the circuit of Fig. 5, the temperature of the blanket 10 may be normally controlled in relation to room temperature by a cycling control device 23 of the character of that disclosed in U. S. Patent No. 2,195,958, granted on April 2, 1940, to William K. Kearsley; and the load circuit includes the inner heating conductor 17 arranged in two sections and connected in parallel relation to the power source via the control box 15 and the plug 16, the resistance of the heating conductor 17 being of the order of 65 ohms. The outer signal conductor 20 is arranged to provide overheating protection, together with the layer 19 of butadiene-acrylonitrile elastomer, that may comprise a film having a thickness of about 0.006''. The overheating protection is afforded by utilizing the change in impedance of the butadiene-acrylonitrile elastomer 19 as the electrical response characteristic at the control temperature level, and is provided through the medium of a work device, such as a lockout relay 24; and the cycling control, responsive to room temperature, of the device 23 is provided by a bimetallic switch 25 having a suitable external adjusting knob 26. The operating coil of the relay 24 is connected across an impedance bridge consisting of a capacitor 27 (about 0.1 mfd.) in a resonant circuit with a choke coil 28 (about 75 henrys), the other two legs of the bridge comprising the resistors 29 and 30 (each about 6800 ohms). The impedance of the coil of the relay 24 should be of the order of 90,000 ohms; and the induced voltage of the resonant circuit, available at the coil of the relay 24, is approximately 130 volts; whereby the relay 24 will pull-in somewhat below that level and will drop-out at about 75 volts.

Assuming that the cycling control device 23 is "calling for heat" (its contacts being closed) power may be applied to the heating conductor 17 of the blanket 10 by momentarily closing a normally open pushbutton switch 31, which will complete a circuit through a power conductor 32, the two branches of the heating conductor 17, a conductor 33, a resistor 34 (about 12,000 ohms), the switch 31 and a power conductor 35. The signal conductor 20, which may have a resistance of about 400 ohms, is connected in series with the center of the resonant circuit comprising the choke coil 28 and the capacitor 27, the connection including two conductors 36 and 37, which terminate suitably at the socket 14. The relay 24 will pull-in to bridge its contacts 38, completing the operating circuit for the heating conductor 17. The resistors 29 and 30 provide a voltage divider circuit, such that if a dead short-circuit occurs across the extremities of the conductors 17 or 20 while the relay 24 is operated, the voltage in the coil of the relay will drop to about one-half line voltage causing the relay 24 to drop-out and open the load circuit at its contacts 38. In normal operation, both the resonant circuit and the power circuit are completed via the contacts 38 of the relay 24 between the conductors 33 and 35; and the voltage limiting resistor 34 is in the resonant circuit to establish the holding voltage of the coil of the relay 24. A neon lamp 39 is energized through a circuit including a resistor 40 (about 200,000 ohms), the conductor 33, the contacts 38 of the relay 24 and the conductor 35, and indicates that the blanket 10 is in operation. The blanket 10 will remain in operation, subject only to the periodic cycling of the bimetallic element 25 of the cycling device 23 so long as the temperature of the control layer 19 of butadiene-acrylonitrile elastomer remains below the cut-off temperature; the resonance of the control circuit is not affected by the operation of the cycling device 23; and the relay 24 remains operated.

A substantial rise in temperature of the control layer 19 is accompanied by a substantial drop in impedance, as explained more fully hereinafter, in the area of the temperature increase thereof, thereby loading the control circuit with a signal current to cause it to go off resonance. As a result of this off-resonance condition of the control circuit, the voltage at the coil of the relay 24 drops to a level below that required to hold it in its operated position; whereby the relay 24 restores interrupting, at its contacts 38, the load circuit including the heating conductor 17. Normal operation of the blanket 10 may be restored again by momentarily closing the pushbutton switch 31, provided, however, that the temperature of the control layer 19 has subsided and is below the control level.

In order purposely to open the load circuit, there is provided a normally open pushbutton control switch 41 provided with contacts shunted directly across the coil of the relay 24. It is, of course, apparent that when the pushbutton switch 41 is operated or closed, the coil of the relay 24 is short-circuited, whereby it restores opening its contacts 38 and consequently the load circuit.

It will be noted that failure of any of the component parts of the control circuit will deenergize the coil of the relay 24 by upsetting or destroying the resonance of the control circuit. The resistor 34 that is placed in series with the heating conductor 17, when the pushbutton switch 31 is manually operated or closed, is effected to reduce the current flow through the heating conductor 17 to such a value, that even if the pushbutton switch 31 is held closed continuously in an attempt to circumvent the control circuit, there is no appreciable heating of the blanket 10.

Considering now in greater detail the operating characteristics of the butadiene-acrylonitrile elastomer control layer or film 19 of the unit 12, it is noted that the total D. C. resistance in megohms per cm.³ thereof varies sharply with temperature. Specifically, this elastomer has a total D. C. resistance of about 8000 megohms per cm.³ at a temperature of about 25° C. (77° F.) and a total D. C. resistance of about 23 megohms per cm.³ at a temperature of about 80° C. (176° F.); also, this elastomer has a specific A. C. resistivity of about $23.0 \times 10^{10}$ ohms at about 25° C. and a specific A. C. resistivity of about $0.41 \times 10^{10}$ ohms at about 80° C.

In the normal operation of the blanket 10, the butadiene-acrylonitrile elastomer control layer 19 may have a temperature of about 105° F., which corresponds to a medium position setting of the control knob 26 of the control device 23 in the circuit of Fig. 5; whereby the resistance of the control layer or film 19 is extremely high so that the control circuit is at resonance retaining the relay 24 in its operated position in order that heating of the heating conductor 17 is continued, subject only to the periodic cycling of the bimetallic element 25, as explained above. On the other hand, when the butadiene-acrylonitrile elastomer control layer 19 has a relatively high temperature well above 105° F., but below about 250° F., the resistance thereof is only moderately high so that a signal current of controlling magnitude is conducted in the control circuit between the heating conductor 17 and the signal conductor 20 through the control layer 19 destroying the resonance of the control circuit, whereby the relay 24 is restored bringing about interruption of the heating current through the heating conductor 17, as explained above. Accordingly, the elastomer 19 has a temperature-impedance coefficient so as variably electrically to insulate the heating conductor 17 and the signal conductor 20 from each other over an operating temperature range up to about 250° F., when a signal potential is impressed therebetween, and so that these conductors are well insulated from each other at relatively low temperatures below about 105° F., and so that a signal current of controlling magnitude is conducted therebetween at relatively high temperatures well above 105° F., but below about 250° F. Also, the magnitude of the signal current is increased both with an increase in the relatively high temperature of a given section of the elastomer 19 and with an increase in the length thereof that is subjected to a given relatively high temperature.

Considering now in greater detail the composition of the butadiene-acrylonitrile elastomer 19, it is noted that it may comprise the product "Chemigum N-3" manufactured by the Goodyear Tire and Rubber Company. More particularly, this product comprises copolymers of butadiene and acrylonitrile and has the general formula:

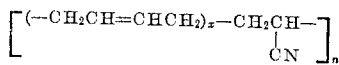

where $x$ is normally in the range 1 to 4, with an average value of about 3; whereby this product normally has the more specific formula:

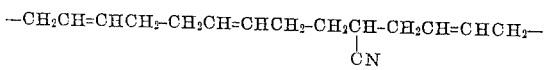

This product is, of course, that which results from the copolymerization of butadiene and acrylonitrile; and normally to this product there are added the usual compounding materials that are ordinarily employed in rubber-making so as to produce the finished elastomer.

By way of illustration, a fundamental batch of elastomer was made in accordance with standard rubber processing techniques and having the following composition:

| Ingredient: | Parts by weight |
|---|---|
| "Chemigum N-3" | 100 |
| Zinc oxide | 5 |
| Stearic acid | 1 |
| Sulfur | 2 |
| "Altax" (benzothiazyl disulfide) | 1 |

This fundamental batch was then split into two portions; the first portion was worked directly into a sheet having a thickness of 10 mils, and the second portion was first mixed with an equal weight of inert filler (Buca clay) and then worked into a sheet having a thickness of 10 mils. These two sheets were then cured 40 minutes at 140° C.; and then electrical measurements were made thereupon, and also upon a 10-mil sheet of nylon (FM 3606) in order to obtain a standard of comparison. These tests included both total D. C. resistance measurements and 60 cycle A. C. specific resistivity measurements, and the following results were obtained:

| Composition | Humidity | 25 C. Measurements | |
|---|---|---|---|
| | | $\rho_{A.C.} \times 10^{10}$ | $R_{D.C.} \times 10^6$ |
| "Chemigum" filled | 30% | 5.8 | 440 |
| "Chemigum" unfilled | 30% | 5.8 | 240 |
| Nylon | 30% | 2.6 | 4,000 |
| "Chemigum" filled | Dry | 23 | 8,000 |
| "Chemigum" unfilled | Dry | 25 | 8,000 |
| Nylon | Dry | 47 | 1,000,000 |

| Composition | Humidity | 25 C. Measurements | |
|---|---|---|---|
| | | $\rho_{A.C.} \times 10^{10}$ | $R_{D.C.} \times 10^6$ |
| "Chemigum" filled | 30% | 0.07 | 2 |
| "Chemigum" unfilled | 30% | | |
| Nylon | 30% | | 0.7 |
| "Chemigum" filled | Dry | 0.41 | 23 |
| "Chemigum" unfilled | Dry | | |
| Nylon | Dry | 0.7 | 90 |

| Composition | Humidity | Ratio: $\frac{\rho\ 25°\ C.}{\rho\ 80°\ C.}$ | Ratio: $\frac{R\ 25°\ C.}{R\ 80°\ C.}$ |
|---|---|---|---|
| "Chemigum" filled | 30% | 83 | 220 |
| "Chemigum" unfilled | 30% | | |
| Nylon | 30% | | 5,900 |
| "Chemigum" filled | Dry | 56 | 350 |
| "Chemigum" unfilled | Dry | | |
| Nylon | Dry | 67 | 1,100 |

Of course $\rho_{A.C.}$ is the specific A. C. resistivity and $R_{D.C.}$ is the total D. C. resistance involving the 10-mil sheets mentioned.

These tests clearly indicate that:

(1) This "Chemigum" (either filled or unfilled) is less sensitive electrically to moisture than is the nylon.

(2) This "Chemigum" (either filled or unfilled) has about the same resistivity as the nylon.

(3) This "Chemigum" (either filled or unfilled) has about the same temperature coefficient of A. C. resistance as does the nylon.

When these findings are considered with the facts that the "Chemigum" elastomer is a tough extensible rubbery material having a high abrasion-resistance comparable to the best grades of natural rubber and having a high tensile strength, it is apparent that it is markedly superior to nylon for the present purpose. Moreover, this elastomer possesses the further important characteristics that are highly desirable in the present arrangement, in that it is age-resistant, quite flexible and subject only to very limited expansion and contraction over the entire temperature 32° F.–250° F., has a softening point well above 250° F., is altogether chemically and physically stable under the operating conditions of the blanket, does not become brittle or develop cracks or fissures after many years of use in the blanket, and requires no fillers or plasticizers that are subject to variation in physical and chemical properties in use in the blanket.

In view of the above, it is apparent that the butadiene-acrylonitrile elastomer set forth is ideally suited for use as the variable electrical insulating layer 19 between the heating conductor 17 and the signal conductor 20 in the unit 12, since it not only possesses the desired electrical operating characteristics, but also the very favorable physical properties, in that it has a high tensile strength, a softening point well above the operating temperature range of the blanket 10, is moisture-resistant and is age-resistant; whereby the thermosensitive operating characteristic of the unit 12 incorporated in the blanket 10 does not depart from the initial thermosensitive characteristics thereof and that desired, even after many years of use of the blanket and in spite of frequent washing and dry-cleaning of the blanket.

In view of the foregoing, it is apparent that there has been provided a combined heating and thermosensitive heating control unit for use in combination with an electrically heated fabric or the like that is normally subjected in use to frequent flexure and folding; which unit incorporates an improved thermosensitive element in the form of a layer or coating of butadiene-acrylonitrile elastomer; whereby the unit has a substantially uniform operating characteristic throughout its exceedingly long life in use.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A combined heating and thermosensitive heating control unit for use in combination with an electrically heated fabric, or the like, that is normally subjected in use to frequent flexure and folding; said unit being of elongated cable-like structure and comprising a flexible heating conductor, a flexible signal conductor, and a flexible solid moisture-resistant butadiene-acrylonitrile elastomer composition in intimate surface contact with said conductors and retaining the same in closely spaced-apart relation, said elastomer having a temperature-impedance coefficient so as variably electrically to insulate said conductors from each other over an operating temperature range up to about 250° F. when a signal potential is impressed therebetween and so that said conductors are well insulated from each other at relatively low temperatures below about 105° F. and so that a signal current of controlling magnitude is conducted between said conductors at relatively high temperatures well above 105° F. but below about 250° F., said temperature-impedance coefficient of said elastomer varying only slightly with changes in moisture content of said elastomer, the magnitude of the signal current being increased both with an increase in the relatively high temperature of a given section of said elastomer and with an increase in the length of said elastomer subjected to a given relatively high temperature, said elastomer also being age-resistant and stable and of high tensile strength in said operating temperature range, whereby said unit is of exceedingly long life in use.

2. The unit set forth in claim 1, wherein said elastomer in said composition consists essentially of copolymers of butadiene and acrylonitrile having the general formula:

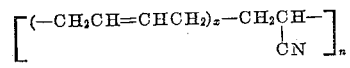

where $x$ is in the range 1 to 4.

3. The unit set forth in claim 1, wherein said elastomer in said composition consists essentially of copolymers of butadiene and acrylonitrile having the general formula:

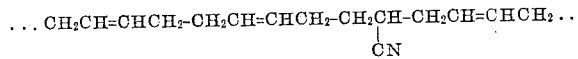

4. The unit set forth in claim 1, wherein said elastomer also contains an inert clay filler.

5. The unit set forth in claim 1, wherein said elastomer composition has a total D. C. resistance of the order of 8000 megohms per cm.³ at a temperature of about 25° C. and a total D. C. resistance of the order of 23 megohms per cm.³ at a temperature of about 80° C.

6. The unit set forth in claim 1, wherein the elastomer composition is such that a sheet thereof having a thickness of about 10 mils has a total D. C. resistance at about 25° C. of the order of 8000 megohms per cm.³ after prolonged subjugation to a dry atmosphere and of the order of 240 to 440 megohms per cm.³ after prolonged subjugation to an atmosphere having a relative humidity of about 30%.

References Cited in the file of this patent

UNITED STATES PATENTS 2,581,212    Spooner et al. _____ Jan. 1, 1952

OTHER REFERENCES

The Goodyear Tire and Rubber Co., Inc. Akron, Ohio, Bulletin titled "Chemigum"; No. S–9904; Copyright 1943, page 32.